United States Patent
Zurhove

(10) Patent No.: US 8,936,678 B2
(45) Date of Patent: Jan. 20, 2015

(54) PROCESS AND PLANT FOR PRODUCING CEMENT CLINKER AND FOR PURIFYING THE OFFGASES FORMED

(75) Inventor: Franz-Josef Zurhove, Waldshut-Tiengen (DE)

(73) Assignee: ELEX CemCat AG, Schwerzenbach (CH)

( * ) Notice: Subject to any disclaimer, the term of this patent is extended or adjusted under 35 U.S.C. 154(b) by 0 days.

(21) Appl. No.: 14/007,524

(22) PCT Filed: Apr. 2, 2012

(86) PCT No.: PCT/EP2012/055976
§ 371 (c)(1),
(2), (4) Date: Dec. 16, 2013

(87) PCT Pub. No.: WO2012/136631
PCT Pub. Date: Oct. 11, 2012

(65) Prior Publication Data
US 2014/0109800 A1    Apr. 24, 2014

(30) Foreign Application Priority Data
Apr. 8, 2011   (DE) .......................... 10 2011 001 933

(51) Int. Cl.
*C04B 7/47* (2006.01)
*C04B 7/36* (2006.01)
(Continued)

(52) U.S. Cl.
CPC .............. *C04B 7/47* (2013.01); *B01D 2251/306* (2013.01); *C04B 7/364* (2013.01); *B01D 2257/302* (2013.01); *B01D 2257/404* (2013.01);
(Continued)

(58) Field of Classification Search
CPC ........................................................... C04B 7/47
USPC ................................................... 106/761, 762
See application file for complete search history.

(56) References Cited

U.S. PATENT DOCUMENTS 3,162,431 A * 12/1964 Muller et al. ................... 432/16
3,989,482 A * 11/1976 Ritzmann et al. .................... 95/3
(Continued)

FOREIGN PATENT DOCUMENTS

DE    102009030902 A1    12/2010
DE    102009048370 A1    1/2011
WO      2009089559 A1    7/2009

*Primary Examiner* — Paul Marcantoni
(74) *Attorney, Agent, or Firm* — Renner Kenner Greive Bobak Taylor & Weber

(57) ABSTRACT

The invention relates to a process and a plant for producing cement clinker and for purifying the off-gases formed thereby, wherein
cement raw meal is preheated in a preheater by means of hot off-gases and then optionally precalcined,
the preheated and optionally precalcined cement raw meal is burnt in a rotary kiln to form cement clinker,
the cement clinker is cooled in a cooler,
the hot off-gases used in the preheater are used in a raw mill for treating the cement raw meal,
the dust content of a dust-containing mill off-gas thereby formed is reduced in a separating device to less than 5 g/Nm$^3$, preferably less than 1 g/Nm$^3$,
alkali hydrogen carbonate and/or alkali carbonate is added to and mixed with the mill off-gas whose dust content has been reduced to less than 5 g/Nm$^3$, and
the mixed gas thereby formed is subsequently fed to a process filter for separation of dust laden with pollutants.

6 Claims, 3 Drawing Sheets

Figure 1:
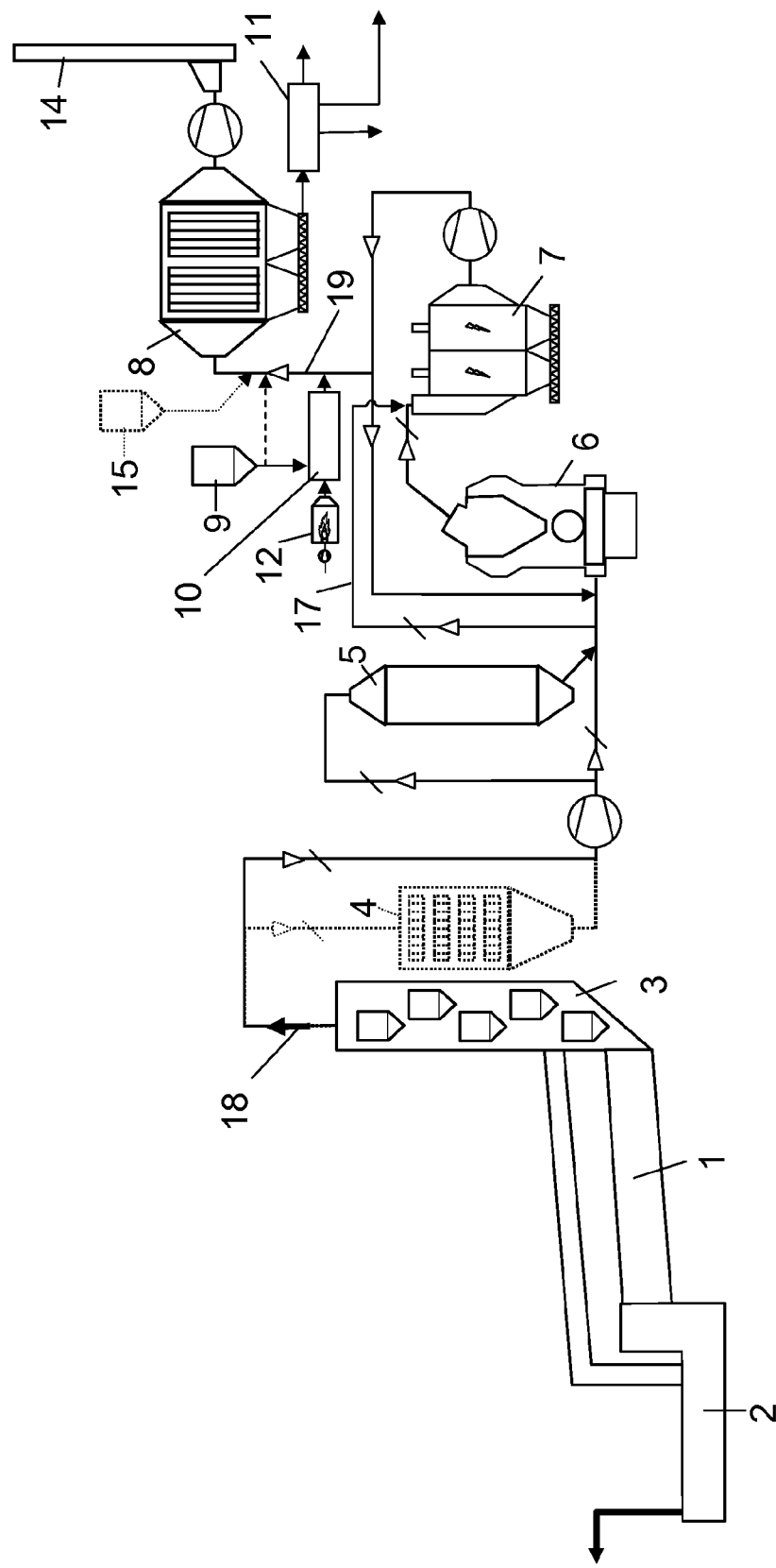

(51) Int. Cl.
*C04B 7/52* (2006.01)
*F27B 7/20* (2006.01)
*B01D 53/40* (2006.01)
*B01D 53/50* (2006.01)
*F27D 17/00* (2006.01)
B01D 53/86 (2006.01)
B01D 53/64 (2006.01)

(52) U.S. Cl.
CPC ... *C04B 7/52* (2013.01); *F27B 7/20* (2013.01); B01D 53/8625 (2013.01); B01D 53/64 (2013.01); B01D 2251/304 (2013.01); B01D 2258/0233 (2013.01); *B01D 53/40* (2013.01); *C04B 7/36* (2013.01); B01D 2251/606 (2013.01); B01D 2257/602 (2013.01); B01D 2257/2047 (2013.01); *B01D 53/508* (2013.01); B01D 2257/2045 (2013.01); *F27D 17/008* (2013.01); B01D 2253/102 (2013.01)
USPC .......................................... 106/761; 106/762

(56) References Cited

U.S. PATENT DOCUMENTS 4,323,344 A * 4/1982 Grudno ........................ 432/106
5,219,544 A    6/1993 Kupper et al.
7,972,419 B2 * 7/2011 Jepsen et al. .................... 95/273

* cited by examiner ized in the presence of halogens. Pre-dedusting to preferably more
PROCESS AND PLANT FOR PRODUCING CEMENT CLINKER AND FOR PURIFYING THE OFFGASES FORMED The invention relates to a process and a plant for producing cement clinker and for purifying the off-gases formed thereby.

The process of producing cement clinker is nowadays conventionally carried out with rotary kilns, upstream of which there are arranged calcination and suspension preheating systems. Owing to the fuels and raw materials that are used, a large number of undesirable trace elements are fed to the process, which elements, according to the species, are integrated wholly or only partially into the cement clinker. Another portion escapes in gas form with the off-gas. Other pollutants, such as, for example, nitric oxides, which leave the preheater via the off-gas, are generated in the process. Sulfur oxide emissions are formed predominantly not by fuel sulfur but by pyrite-containing raw materials, which are already liberated in the uppermost stages of the preheater, where they do not react, like the fuel sulfur, predominantly by CaO to give $CaSO_4$. Chlorine and fluorine are likewise introduced from raw materials and fuels and escape in part with the off-gas in the form of HCl and HF. In addition, mercury is fed to the process by fuels and raw materials and, owing to its high volatility, escapes completely from the preheater.

The injection of calcium hydroxide and sodium bicarbonate (sodium hydrogen carbonate) is generally known as prior art for the chemical flue gas treatment of the acidic gas constituents $SO_x$, HCl and HF.

The temperatures in the uppermost preheater stage are frequently too low for efficient sulfur incorporation with calcium hydroxide. That temperature is determined primarily by the number of cyclone stages and is so chosen that sufficient heat for drying and grinding is present and the increased fuel consumption associated with higher temperatures is avoided. Volatile sulfur compounds are already liberated in the uppermost cyclone stage, so that the sorbent must also be present in that location. The increasingly strict limiting values can therefore frequently no longer be achieved technically and/or economically by the injection of calcium hydroxide. The high molar $CaO/SO_x$ ratios that are required in other cases also change the CaO concentration in the cement clinker production process, and accordingly the properties of the cement clinker that is produced, in an undesirable manner. An alternative to the hot injection of calcium hydroxide is a position at a small distance from the water dew point. The coldest position which comes closest to this condition is located at the process filter upstream of the off-gas chimney. The small distance from the water dew point is required for high separation efficiencies, is not present even at that position and can be achieved only with an extreme technical outlay.

The injection of alkali hydrogen carbonate yields substantially more efficient pollutant adsorption than does the injection of calcium hydroxide. Separation efficiencies of the acidic pollutant components of from 70% to far greater than 90% are achievable with molar ratios of only from 1.0 to 1.5. The prevailing gas temperature of the preheater off-gas is also suitable therefor. Alkalis, such as sodium, are, however, very disruptive for the cement clinker production process and must be limited to very low concentrations. The injection of this sorbent into the dust-laden off-gas of the cement production process therefore necessarily leads to unacceptable mixing of the dust with sodium. The ratio by mass of the dust carried in the off-gas to the sorbent is in most cases more than 100 and can easily exceed values of 1000. These large amounts of dust have to be disposed of, which is not possible. Disposal is also necessary owing to the chlorine and sulfur adhering to the sorbent, which must not be fed back into the cement production process completely and therefore must for the most part be discharged.

WO 2009089559 A describes a process which provides pre-dedusting of the preheater off-gas, preferably by means of a hot electrostatic filter, and arranges an SCR catalyst directly downstream thereof. The SCR catalyst reduces nitrogen oxides with added ammonia or ammonia-containing compounds and also oxidizes most hydrocarbon compounds, especially the long-chain and aromatic compounds that are harmful to health. In addition, elemental mercury is oxidized in the presence of halogens. Pre-dedusting to preferably more than 90-95% allows the amount of off-gas dust to be reduced considerably. The remaining amount of dust is therefore suitable in principle for an alkali hydrogen carbonate injection downstream of the catalyst. However, this is true only for so-called direct operation, in which the gases, optionally after cooling by the injection of water in a cooling tower, are passed directly to the process filter.

However, because the hot off-gas of a cement production plant is guided for approximately 80% of the operating time via a raw mill for the purpose of drying and grinding the raw material, the off-gas again takes up large amounts of dust in the mill.

This operation is referred to as interconnected operation. The dust contained in the off-gas of the raw mill, the so-called cement raw meal, is conventionally separated off again in cyclones to a residual gas dust of from 20 to 50 $g/Nm^3$. Temperatures of 80-110° C. prevail downstream of the cyclones of the raw mill. A portion of the gas is recirculated to the raw mill, while the other portion is guided to the final process filter upstream of the off-gas chimney. The high residual amounts of dust downstream of the cyclones of the raw mill would again lead to pronounced dilution of an injected sorbent, which corresponds to the problems already described downstream of the preheater.

Furthermore, the temperature downstream of the mill is in most cases not sufficient for the required conversion of the sodium bicarbonate into sodium carbonate, which generates the high porosity required for sorption. Pre-dedusting upstream of the SCR catalyst is effective for only about 20% of the operating time and is therefore not practicable. For these reasons, the use of alkali hydrogen carbonate did not come into consideration in connection with the purification of off-gases in cement production.

There is further known from DE 40 00 795 A1 a process for purifying the off-gases of plants for the production of cement clinker, wherein the off-gases of the preheating zone are dedusted after passing through a cooling tower or a raw mill, before they are purified of pollutants in a filter zone. There are provided for that purpose a filter stage which serves to bind $NH_4$ compounds, heavy metals and trace elements as well as $SO_2$, and a filter stage which serves to reduce $NO_x$ compound.

The object underlying the invention is, therefore, to provide a process and a plant for producing cement clinker and for purifying the off-gases formed thereby, wherein the economically expedient and effective separation of pollutants is possible even in interconnected operation with a raw mill.

According to the invention, the objection is achieved by the features of claim 1.

The process according to the invention for producing cement clinker and for purifying the off-gases formed thereby comprises substantially the following process steps:

cement raw meal is preheated in a preheater by means of hot off-gases and then optionally precalcined, the preheated and optionally precalcined cement raw meal is burnt in a rotary kiln to form cement clinker, the cement clinker is cooled in a cooler, the hot off-gases used in the preheater are used in a raw mill for treating the cement raw meal, the dust content of a dust-containing mill off-gas formed thereby is reduced in a separating device to less than 5 $g/Nm^3$, preferably less than 1 $g/Nm^3$, alkali hydrogen carbonate and/or alkali carbonate is added to and mixed with the portion of the mill off-gas whose dust content has been reduced to less than 5 $g/Nm^3$ and which has been passed from the separating device to the process filter, and the mixed gas formed thereby is subsequently fed to the process filter for separation of dust laden with pollutants.

The plant according to the invention for producing cement clinker and for purifying the off-gases formed thereby consists substantially of a preheater for preheating cement raw meal, an optional calcinator for precalcining the preheated cement raw meal, a rotary kiln for burning the preheated and optionally precalcined cement raw meal to form cement clinker, a cooler for cooling the cement clinker, a raw mill for drying and grinding cement raw materials to form cement raw meal, which raw mill is connected to the preheater for the supply of hot preheater off-gases, an optional SCR catalyst which is integrated into the gas stream downstream of the preheater and upstream of the raw mill, a separating device, connected to the raw mill, for pre-dedusting the mill off-gas of the raw mill, which separating device has a separation efficiency that leads to a residual dust content in the mill off-gas of less than 5 $g/Nm^3$, preferably less than 1 $g/Nm^3$, a downstream process filter, arranged upstream of an off-gas chimney, for purifying the pre-dedusted mill off-gas, and a feed point for alkali hydrogen carbonate and/or alkali carbonate into a line connecting the separating device to the process filter.

With this process or the plant indicated above, the emissions of the acidic constituents sulfur oxides, hydrogen chloride and hydrogen fluoride as well as mercury and its compounds can be reduced considerably. If the optional SCR catalyst is present, nitrogen oxides, volatile hydrocarbon compounds as well as dioxins and furans are also reduced considerably and the mercury separation is increased further. The dust separated in the process filter during the process can, for example, be added to the cement grinding as a substance stream and/or disposed of or deposited and/or fed to the mill off-gas again as the sorbent. Furthermore, the separated dust can be treated for extraction of the alkali metal and separated pollutants, as a result of which the recycling of the majority of the dust to the kiln system or to the cement mill is possible.

Further embodiments of the invention are provided by the dependent claims.

According to a particularly preferred embodiment of the invention, alkali hydrogen carbonate is calcined to alkali carbonate before being added to the mill off-gas by injection into a hot gas. This is advantageously carried out in a calcination device having a hot gas connection, a feed point for alkali hydrogen carbonate and an outlet, the outlet being connected to a line that connects the separating device to the process filter.

According to a further embodiment of the invention, there is used as the hot gas for the calcination of the alkali hydrogen carbonate a partial stream of a hot off-gas that is formed in the cement production process, in particular the hot off-gas used in the preheater. In this manner, particularly economical calcination of the alkali carbonate is obtained.

The addition of activated carbon or lignite coke between the separating device and the process filter can further be provided in order in particular to permit very effectively an increase in the reduction of mercury.

According to a further embodiment of the invention, an SCR catalyst is arranged between the preheater and the raw mill, it additionally being possible for a hot electrostatic filter to be provided between the preheater and the SCR catalyst. The separating device connected to the raw mill is preferably also formed by an electrostatic filter.

It is further known that alkali hydrogen carbonate also has a limited adsorption action for mercury and its compounds. An upstream SCR catalyst has an oxidizing action on the mercury contained in the off-gas, as a result of which the adsorption action of the alkali hydrogen carbonate for mercury is increased.

Various exemplary embodiments of the invention are explained in greater detail in the following by means of the drawing and the description.

Figure 2:
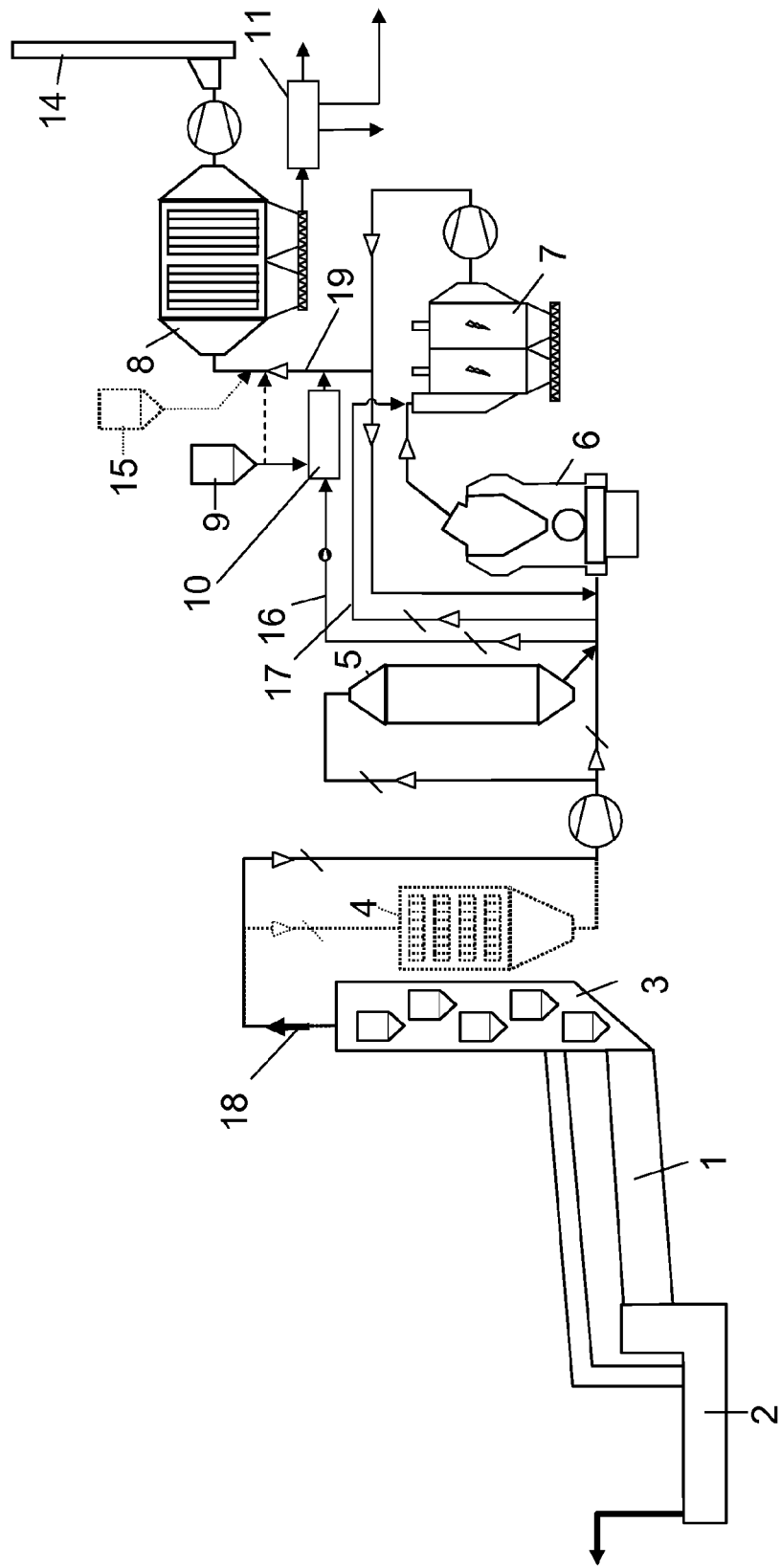
Figure 3:
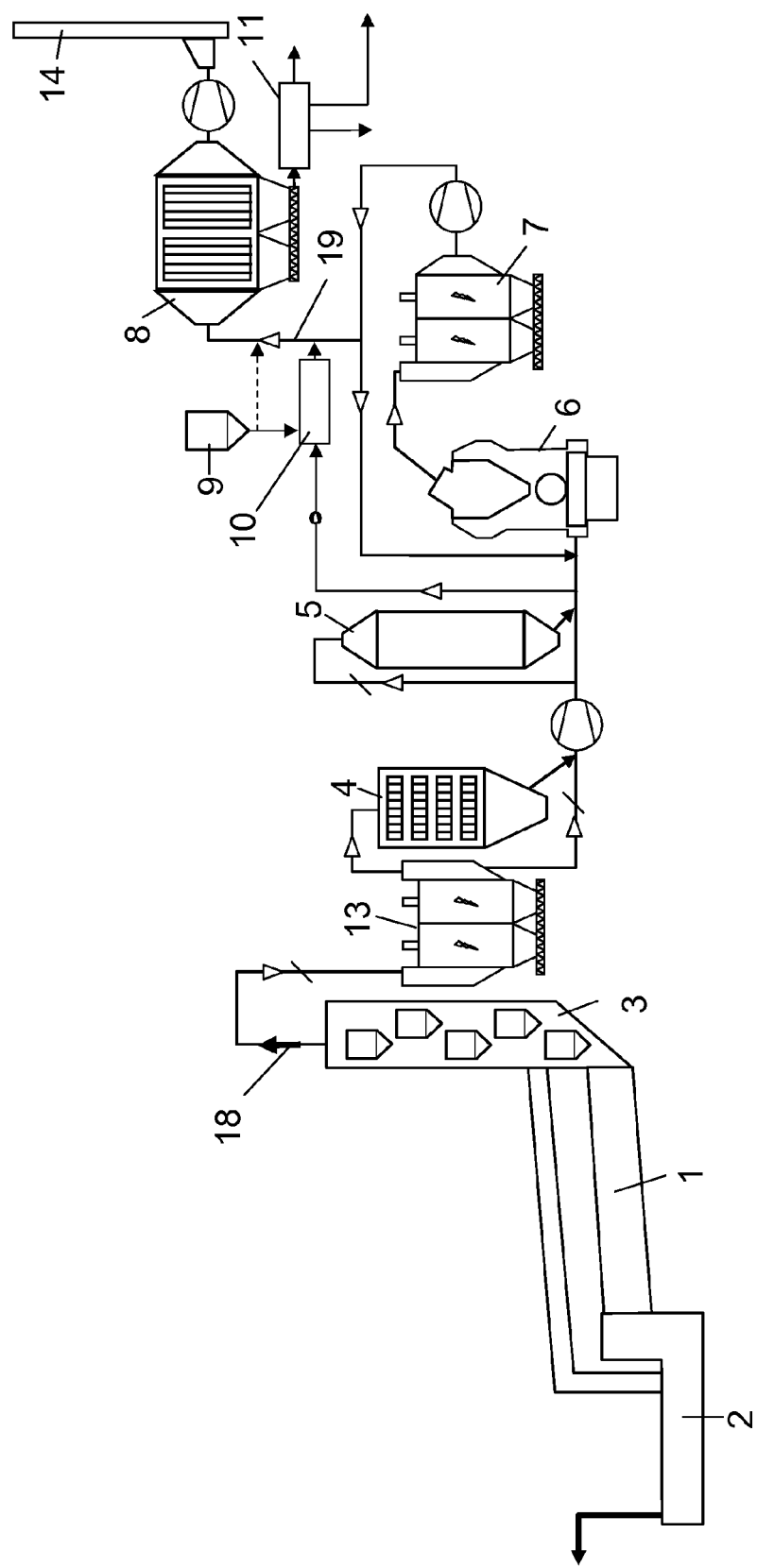

In the drawing:

FIG. 1 shows a schematic representation of a plant for producing cement clinker and for purifying the off-gases formed thereby according to a first exemplary embodiment, FIG. 2 shows a schematic representation of a plant for producing cement clinker and for purifying the off-gases formed thereby according to a second exemplary embodiment, and FIG. 3 shows a schematic representation of a plant for producing cement clinker and for purifying the off-gases formed thereby according to a third exemplary embodiment.

The plant shown in FIG. 1 consists substantially of a rotary kiln 1, a cooler 2 and a preheater 3. The off-gases of the rotary kiln are used in conventional form for preheating cement raw meal in the preheater. The preheater off-gases 18 formed in the preheater are guided in interconnected operation by way of a raw mill 6 having a downstream separating device 7, before the off-gas is purified in the process filter 8 upstream of an off-gas chimney 14. In direct operation, the raw mill 6 is bypassed, the preheater off-gas passing by way of a cooling tower 5 and a line 17 directly into the separating device 7 and from there into the process filter 8. The desired gas streams are adjusted by the flap settings, which will not be discussed in greater detail here.

An electrostatic filter is preferably used for the separating device 7 downstream of the raw mill 6, because such a filter, unlike cyclones, permits the desired residual dust contents of less than 5 $g/Nm^3$, preferably less than 1 $g/Nm^3$, and in addition is smaller in construction than a bag filter and exhibits smaller pressure losses. Electrical energy is also saved compared with conventional cyclones. The gas velocity in the electrostatic filter is preferably more than 1.4 m/s.

A bag filter is preferably used for the final process filter, because sorption of the pollutants is improved on the filter cake. Owing to the small amounts of dust as a result of the separating device 7, the process filter can be designed with a high ratio of gas volume flow to bag surface area (in particular greater than or equal to 1.2 $m^3/(m^2 \, min)$), and accordingly can be smaller, than without pre-separation. In addition, the pressure loss in the bag filter, and accordingly the electrical energy requirement, falls.

The invention further provides the addition of a sorbent in the form of alkali hydrogen carbonate and/or alkali carbonate 9. The sorbent can be fed either directly (dotted line) or by way of a calcination device 10 into a line 19 connecting the separating device 7 and the process filter 8. In direct operation, the off-gas conditioned by the cooling tower 5 is guided through the gas line 17 past the raw mill 6 directly to the separating device 7 and is there pre-dedusted, so that the sorbent injection can subsequently take place and the off-gas is separated in the process filter 8 with the residual dust and the sorbent. In this operating mode, an additional supply of heat for calcination is not required.

In the calcination of the alkali hydrogen carbonate 9, which takes place in a very short time at a sufficiently high temperature, highly porous alkali carbonate forms, which is particularly suitable for adsorption of the pollutants contained in the off-gas. Owing to the pre-dedusting in the separating device 7, the residual dust content is low, so that the dilution of the highly porous alkali carbonate is acceptable and above all the residual amount of dust forming in the process filter remains limited.

In interconnected operation in particular, the heat of the mill off-gas is in most cases no longer sufficient for rapid calcination of the alkali hydrogen carbonate 9, so that the calcination device 10 is used, which in the exemplary embodiment shown is supplied with heat by way of an additional furnace 12.

In the exemplary embodiment of FIG. 2, instead of the additional furnace 12, a small partial gas stream of the hot preheater off-gas 18, which here is still sufficiently hot, is fed by way of a line 16 to the calcination device 10. The energy consumption and the outlay in terms of the plant are reduced significantly as a result, because the furnace 12 shown in FIG. 1 is no longer necessary.

In both exemplary embodiments, an SCR catalyst 4 can optionally be arranged in high-dust configuration downstream of the preheater 3. In FIG. 3, the SCR catalyst 4 is shown with an upstream hot electrostatic filter 13. In this case, no gas line 17 to the filter 7 is required in direct operation because dedusting takes place by the hot electrostatic filter 13. The catalyst can additionally be bypassed by an additional outlet at the hot electrostatic filter 13.

In all three exemplary embodiments, the addition of activated carbon or lignite coke 15, which in this representation is added separately, is shown as a further option. Alternatively, this addition can also take place into the calcination device 10. Activated carbon or lignite coke can improve the separation of mercury significantly, in particular to 95% or more. Prior mercury oxidation in the SCR catalyst 4 additionally has a positive effect on the separation efficiency.

In the process filter, the supplied off-gas laden with pollutants and with the supplied sorbents is purified in such a manner that the prescribed limiting values for the purified off-gas discharged into the atmosphere by way of the waste air chimney are observed. The mixture of process dust and sorbent separated in the process filter 8 can be worked up in a device 11.

During the treatment, the alkali sulfate formed by $SO_2$ separation can be converted in a known manner into calcium sulfate and alkali halide by washing with a calcium halide. The calcium sulfate that is separated off can in turn be used as a solidification regulator in the cement mill. Reference is made in this connection to DE 10 2009 030 902 A1. Mercury can be driven off by heating at high temperatures and concentrated very greatly in a bed of activated carbon or lignite coke, in order to keep the amounts to be deposited small. Reference is made in this connection to DE 10 2009 036 950 A1.

Furthermore, sorbent that is still usable can be recirculated and added to the off-gas again. The remainder is deposited.

The invention claimed is:

1. A process for producing cement clinker and for purifying the off-gases formed thereby, wherein
    cement raw meal is preheated in a preheater by means of hot off-gases,
    the preheated cement raw meal is burnt in a rotary kiln to form cement clinker, or the preheated cement raw meal is first precalcined before it is burnt in the rotary kiln to form cement clinker,
    the cement clinker is cooled in a cooler,
    the hot off-gases used in the preheater are used in a raw mill for treating the cement raw meal,
    the dust content of a dust-containing mill off-gas formed thereby is reduced in a separating device, and
    the mill off-gas is subsequently purified in a final process filter upstream of an off-gas chimney,
characterized in that
    the dust content of the mill off-gas is reduced in the separating device to less than 5 $g/Nm^3$,
    alkali hydrogen carbonate and/or alkali carbonate is added to and mixed with the portion of the mill off-gas whose dust content has been reduced to less than 5 $g/Nm^3$ and which has been passed from the separating device to the process filter, and
    the mixed gas formed thereby is subsequently fed to the process filter for separation of dust laden with pollutants.

2. The process according to claim 1, characterized in that, before being added to the mill off-gas, alkali hydrogen carbonate is calcined to form alkali carbonate by injection into a hot gas.

3. The process according to claim 2, characterized in that there is used as the hot gas for the calcination of the alkali hydrogen carbonate a partial stream of the hot off-gases used in the preheater.

4. The process according to claim 1, characterized in that the dust laden with pollutants from the process filter is disposed of or treated for the extraction of alkali metal and separated pollutants.

5. The process according to claim 3, characterized in that the dust separated in the process filter, including the sorbents and pollutants, is treated by addition of a calcium halide, and the calcium sulfate formed thereby is separated off and used as an additive in the cement production.

6. The process according to claim 1, characterized in that activated carbon or lignite coke is additionally added to the off-gas between the separating device and the process filter.

* * * * *